No. 610,285. Patented Sept. 6, 1898.
J. W. SCOLES.
CUP OR PAIL.
(Application filed Mar. 15, 1897.)
(No Model.)
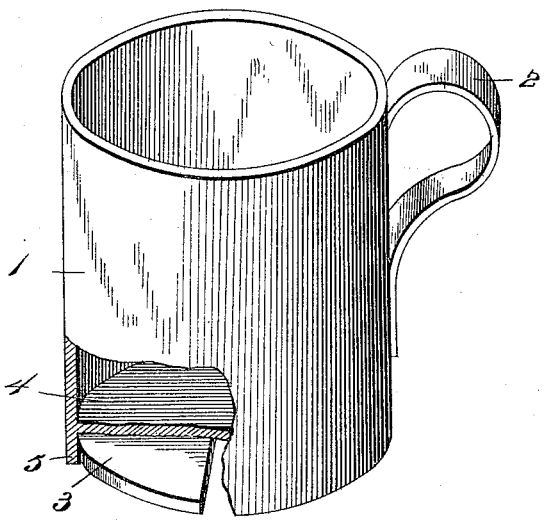
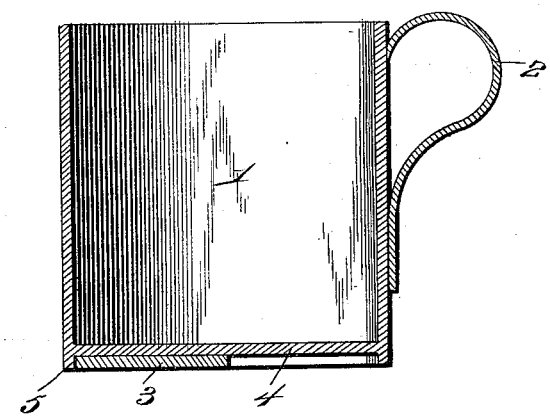
Witnesses
F. Wieser.
H. H. Bemberg
James W. Scoles, Inventor,
By his Attorneys.
C. A. Snow & Co.

UNITED STATES PATENT OFFICE.

JAMES W. SCOLES, OF MARTINSVILLE, ILLINOIS.

CUP OR PAIL.

SPECIFICATION forming part of Letters Patent No. 610,285, dated September 6, 1898.

Application filed March 15, 1897. Serial No. 627,477. (No model.)

*To all whom it may concern:*

Be it known that I, JAMES W. SCOLES, a citizen of the United States, residing at Martinsville, in the county of Clark and State of Illinois, have invented certain new and useful Improvements in Cups or Pails; and I do hereby declare the following to be a full, clear, and exact description of the invention, such as will enable others skilled in the art to which it appertains to make and use the same.

My invention relates to improvements in cups and analogous vessels provided with handles on one side of the vertical center of the cup-body; and the object that I have in view is to provide an improved construction of the vessel which will prevent it from sinking when floated in water or other fluids.

Drinking cups and vessels of ordinary construction are equipped with handles on one side of the vessel, and common knowledge teaches us that such cups are liable to be turned over and sink to the bottom of water or other liquid when the cup is allowed to remain in a pail or other vessel containing the liquid. This is due to the fact that the weight of the handle attached to one side of and exteriorly to the vessel at its upper edge causes the vessel to tilt or cant sidewise so that the liquid will flow over into the cup and fill the same so as to overcome its buoyancy and cause it to be submerged in the water, thus making it inconvenient to reach the cup when the latter is to be used.

I am aware that prior to my invention it has been proposed to counterweight a cuspidor for the purpose of giving a self-righting effect in the event of the implement being kicked or turned over accidentally. In devices of this character the handle is wanting, the upper open end of the vessel is flared to produce an enlarged mouth with an annular bead adapted to serve as a fulcrum in righting the vessel, and the counterweight is placed centrally within the vessel so as to lie concentric with the vessel and in the vertical axial plane thereof. Such concentric arrangement of the counterweight in a cuspidor is not adapted to answer the purposes of my invention because of the provision of the handle on one side of the vessel exteriorly thereto and on one side of the vertical axis of the vessel.

In my improved drinking-cup I employ a counterweight in the bottom of the cup on the opposite side of the vertical axis thereof from the handle, by which the weight is made to operate by virtue of a liquid fulcrum which is in a plane between the counterweighted side of the cup and the side to which the handle is attached. The counterweight in my vessel is thus peculiarly disposed on the vessel in relation to the handle with a view to utilizing the water on which the vessel floats as a fulcrum, and the cup is thus adapted to float on the surface of the water to maintain itself normally in an upright position thereon. The counterweight in my vessel thus does not have a tendency to give to the receptacle a "self-righting" tendency; but it maintains the vessel always in a normal upright position against any tendency to cant sidewise and become submerged in the water.

In the drawings, Figure 1 is a perspective view of a drinking-cup, partly broken away to show the counterweight in the bottom thereof. Fig. 2 is a vertical section more clearly showing the counterweight in the annular flange below the bottom of the vessel.

Like numerals of reference denote like and corresponding parts in each figure of the drawings.

The drinking-cup is designated in its entirety by the numeral 1 in the accompanying drawings, and it is made of any suitable material and of a shape preferred by the manufacturer or public.

To one side of the cup and externally thereto is secured a handle 2, by which the cup may be conveniently manipulated. As is usual, the handle is secured to the cup at or near the upper edge thereof, and in ordinary vessels the weight of the handle, together with its position on the outside and upper end of the same, causes the cup to tilt to a position where the water fills the cup and causes it to sink. To overcome this defect, I arrange a counterweight 3 below and against the bottom of the vessel on the opposite side of the vertical axis of the vessel to the side on which the handle is affixed. The edge of the vessel-body is formed with a depending flange 5, arranged to form within itself a recess 4 below the bottom, and in this recess is fitted the counterweight, which is secured in place by any suitable means. The counterweight is made of a suitable metal, and it is of semicircular form, so as to have a straight inner edge and an arc-shaped edge, whereby the counterweight is compactly arranged below the vessel-bottom and is adapted to cover practically one-half of the area of the bottom.

The device is simple and durable in construction, efficient in service, and cheap of manufacture.

Having thus described the invention, what I claim is—

As a new article of manufacture, a drinking-cup provided on its outside with a handle, a depending flange below the bottom of said cup and forming a recess, and a counterweight secured within the recess to partially cover the face of the cup-bottom and arranged on one side of the vertical axis of the cup-body opposite to the side to which the handle is secured, whereby the vessel is maintained normally in an upright position to float on the water by the counterweight which is disposed to utilize the liquid as a fulcrum in overbalancing the gravity of the handle, substantially as described.

In testimony whereof I have signed this specification in the presence of two subscribing witnesses.

JAMES W. SCOLES.

Witnesses:
F. F. BLANKENBAKER,
WM. J. SUTTON.